(12) United States Patent
Laib et al.

(10) Patent No.: US 7,191,981 B2
(45) Date of Patent: Mar. 20, 2007

(54) TELESCOPING POWERED SEAT TRACK COVER

(75) Inventors: Trevor M Laib, Woodinville, WA (US); Bradley J Mitchell, Snohomish, WA (US); Samuel J Feist, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/983,906

(22) Filed: Nov. 8, 2004

(65) Prior Publication Data

US 2006/0097109 A1    May 11, 2006

(51) Int. Cl.
*B64D 11/06* (2006.01)

(52) U.S. Cl. ................. 244/118.6; 244/122 R (58) Field of Classification Search ............ 244/118.1, 244/118.5, 118.6, 129.1; 439/131, 210, 11 C; 174/76, 10, 70 R, 72 A, 74 R, 209, 217.4; 296/65.13
See application file for complete search history.

(56) References Cited

U.S. PATENT DOCUMENTS

| | | | |
|---|---|---|---|
| 4,428,078 A | 1/1984 | Kuo | |
| 4,763,360 A | 8/1988 | Daniels et al. | |
| 4,853,555 A | 8/1989 | Wheat | |
| 4,875,871 A * | 10/1989 | Booty et al. | ................ 439/209 |
| 4,936,527 A * | 6/1990 | Gorges | .................... 244/118.6 |
| 6,267,430 B1 * | 7/2001 | Cresseaux | ............... 296/65.13 |
| 6,527,566 B1 * | 3/2003 | Lambiaso | ................... 439/131 |
| 6,601,798 B2 | 8/2003 | Cawley | |
| 6,619,588 B2 * | 9/2003 | Lambiaso | ................ 244/118.5 |
| 2002/0144835 A1 * | 10/2002 | Samhammer | ............. 174/72 A |
| 2004/0129445 A1 * | 7/2004 | Winkelbach et al. | ......... 174/76 |
| 2004/0159764 A1 * | 8/2004 | Oshima et al. | ............. 248/429 |

* cited by examiner

*Primary Examiner*—Galen Barefoot
(74) *Attorney, Agent, or Firm*—Harness, Dickey & Pierce, P.L.C.

(57) ABSTRACT

A seat track cover having telescopically engaged first and second portions that enables an overall length of the seat track cover to be adjusted as needed to cover a portion of a seat track that separates two adjacent seats mounted to the seat tracks. A cable can be routed within the first and second portions to enable electrical or optical signals to be conducted between data/power connection ports on the seats. One embodiment includes mating conductive elements formed along the lengths of each of the first and second portions.

20 Claims, 9 Drawing Sheets

TELESCOPING POWERED SEAT TRACK COVER

FIELD OF THE INVENTION

The present invention relates to mobile platform passenger seats. In particular, the present invention relates to an expandable seat track cover that covers portions of a seat track between two adjacent seats.

BACKGROUND OF THE INVENTION

Aircraft passenger seats are fixedly secured within an aircraft passenger cabin through cooperation with a seat track. The seat track typically extends the entire length of the passenger cabin. The seats are secured to the seat track at spaced apart intervals along the seat track. Therefore, the portions of the seat track between the seats are not used to secure the seats. The portions of seat track between the seats are typically covered by a seat track cover.

The distance between the passenger seats, or seat pitch, varies depending on, for example, the aircraft operator, the class of service, the location of the seat within the passenger cabin, and the purpose of the aircraft. It is not uncommon for one aircraft to have a wide range of different seat pitches. Consequently, numerous seat track covers of numerous different sizes must be manufactured and kept on hand to accommodate the different seat pitches, thus increasing the cost of manufacturing and storing the seat tracks covers and increasing the difficulty and time required to install the seat track covers.

In view of the forgoing, it would be highly desirable to provide a seat track cover that is expandable to cover the portions of the seat track between two seat groups regardless of the distance between the seat groups. It is further desirable that the seat track cover be capable of transferring data and/or electrical power between the seat groups.

SUMMARY OF THE INVENTION

In one preferred form, the present invention provides for a seat track cover adapted to be secured over a seat track, where the seat track extends between a first seat and a second seat. The seat track cover includes a first portion and a second portion to form a two piece assembly that allows the overall length of the cover to be adjusted to a desired length. In this manner, the length of the seat track can be tailored to match the length of the uncovered portion of the seat track, thus eliminating the need to maintain covers of various fixed lengths to suit specific applications.

In one preferred form, the invention provides for a seat track cover for covering portions of a seat track between a first seat and a second seat that are both mounted to the seat track, and where the seat track is used on a mobile platform. The seat track cover includes an upper portion, side walls depending from the upper portion. The overall length of the seat track cover is adjustable.

The invention still further provides for a method for covering portions of a seat track located between a first seat and a second seat. The method comprises forming a cover having a first portion and a second portion. The second portion is slidably coupled to the first portion so that it can extend from the first portion at a variety of different distances to precisely match the distance between the first seat and the second seat.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
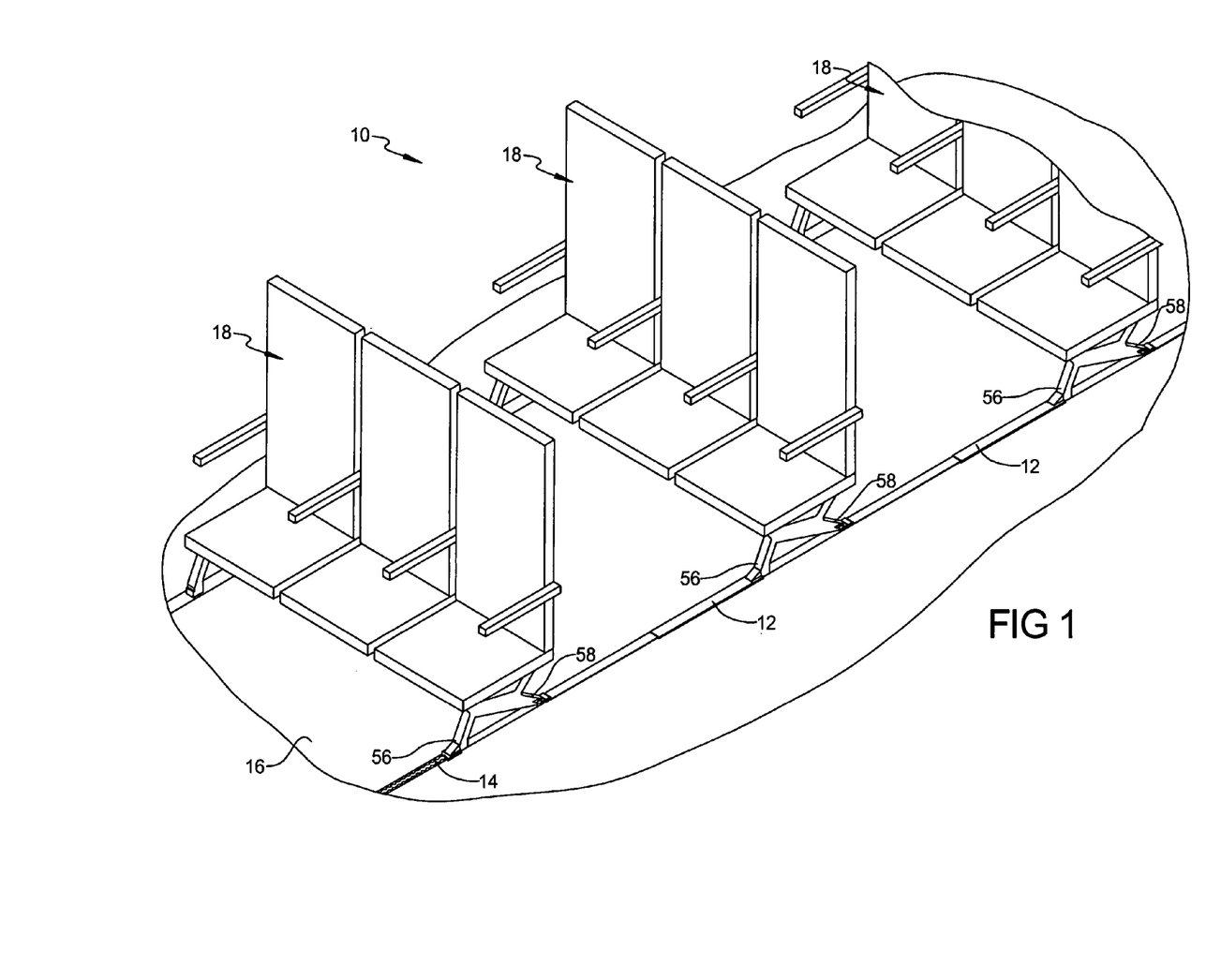
FIG. 1 is a perspective view of a number of aircraft passenger seat groups secured to a seat track with the portions of the seat track between the seat groups covered by a seat track cover according to the present invention.

FIG. 1 illustrates a portion of an aircraft passenger cabin 10 equipped with a number of seat track covers 12 according to a preferred embodiment of the present invention. A seat track 14 is recessed within an aircraft passenger cabin floor 16. A number of spaced apart passenger seat groups 18 are secured to the seat track 14. The seat track covers 12 are positioned between the seat groups 18 and cover the portions of the seat track 14 between the seat groups 18. It will be appreciated that the present invention is not limited to use in aircraft passenger cabins, but can be implemented in any form of mobile platform such as a ship, train, bus, motorcraft, etc., as well as on any stationary platform such as in theatre seats and stadium seats.

Figure 2:
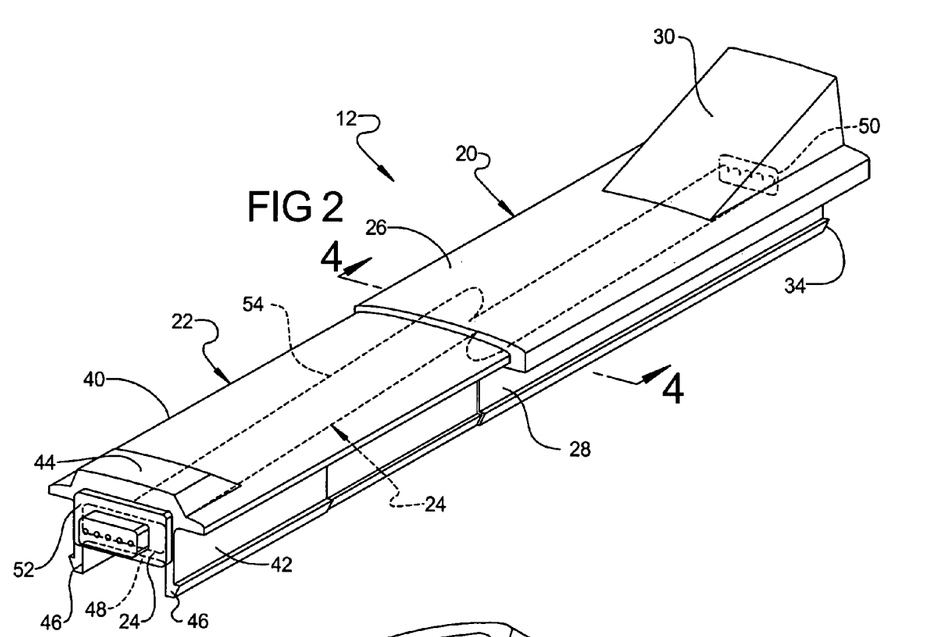
FIG. 2 is a perspective view of a seat track cover according to an embodiment of the present invention.

With additional reference to FIG. 2, the seat track cover 12 generally includes a first portion 20 and a second portion 22. The first portion 20 slidingly receives the second portion 22 to allow the overall length of the cover 12 to be varied as needed. Extending through both the first portion 20 and the second portion 22 is an optional cable 24.

Figure 3:
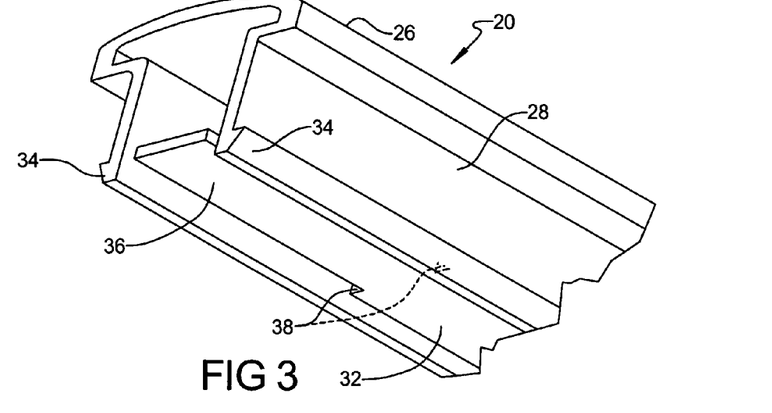
FIG. 3 is a perspective view of a first portion of the seat track cover of FIG. 2.
Figures 4, 5:
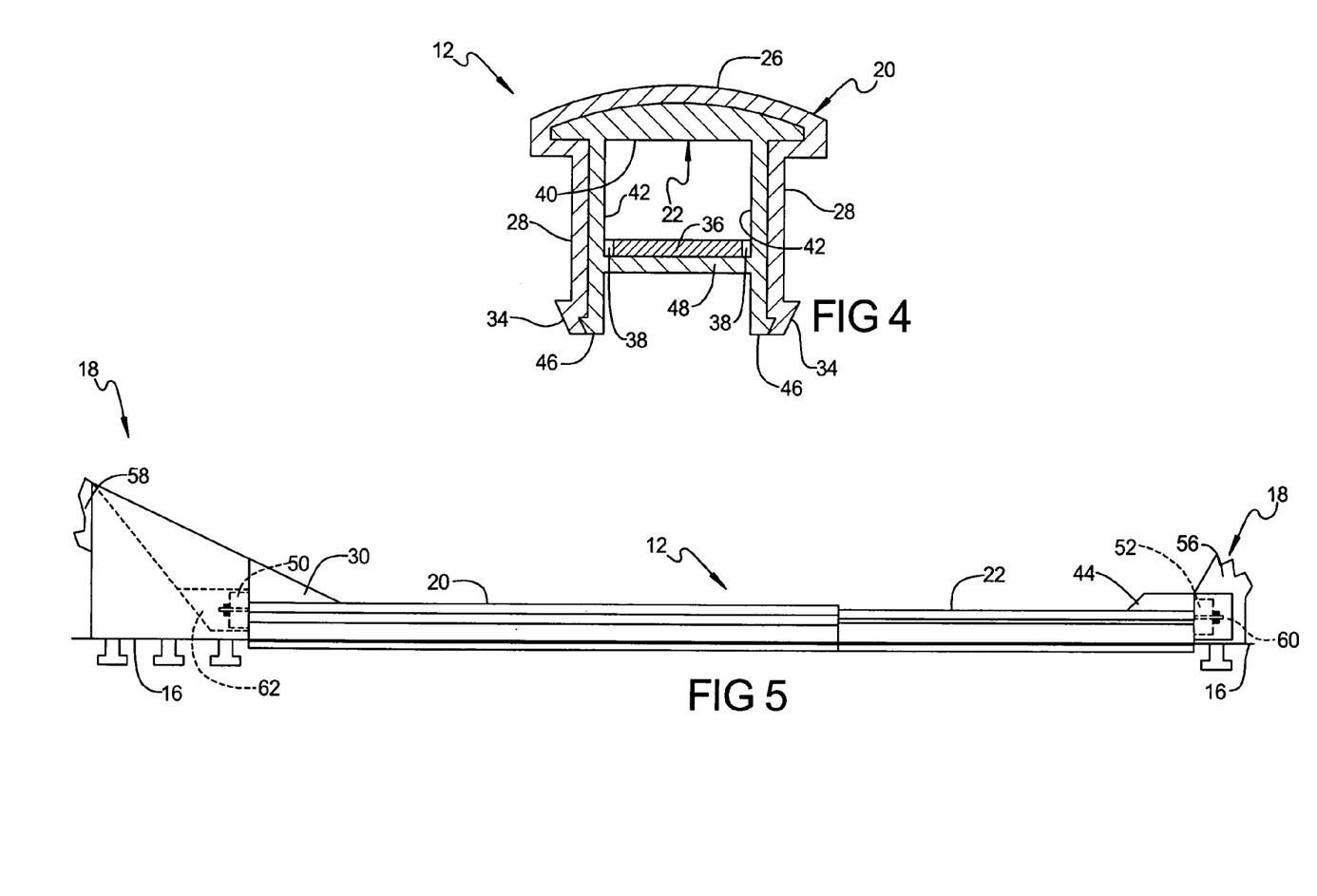
FIG. 4 is a cross-sectional view taken along line 4—4 of FIG. 2.
FIG. 5 is a side view showing the seat track cover of FIG. 2 positioned between and connected to two seat legs of two different seat groups.

With additional reference to FIGS. 3 and 4, the first portion 20 generally includes an upper portion 26 and a pair of side walls 28 that depend from the upper portion 26. The upper portion 26 is illustrated as having a crowned portion, but can also be planar or any other suitable shape. Extending from the upper portion 26 is a seat leg shroud 30 sized to receive a portion of a rear seat leg.

Referring to FIG. 3, the side walls 28 are joined by a bottom portion 32 extending therebetween. Each side wall 28 includes a flange 34. The bottom portion 32 includes a tongue or tab 36. The tab 36 is narrower than the width of the rest of the bottom portion 32 and defines two slots 38 between the tab 36 and each side wall 28. The slots 38 are at least wide enough to receive a portion of the second portion 22.

Each flange 34 is typically angled to engage portions of the underside of the floor 16 on either side of the seat track 14. However, each flange 34 can include any type of detail or be of any suitable shape to promote cooperation between the flange 34 and the floor 16. Each side wall 28 is at least somewhat flexible to allow its flange 34 to engage the floor 16 in a snap-fit manner.

Referring to FIG. 2, the second portion 22 of the seat track cover 12 is similar in construction to the first portion 20. The second portion 22 includes an upper portion 40 and a pair of side walls.

The upper portion 40 is substantially similar to the upper portion 26 and the description of the upper portion 26 equally applies to the upper portion 40. However, the upper portion 40 has dimensions that are slightly smaller than the upper portion 26 so that the first portion 20 can receive the second portion 22. The upper portion 40 includes a seat leg shroud 44 that extends upward from the upper portion 40. The seat leg shroud 44 is sized to receive a portion of a front seat leg.

The side walls 42 also each include a flange 46. The flanges 46 are substantially similar to the flanges 34 of the first portion 20 and are angled to permit cooperation with the floor 16. Referring to FIG. 4, the side walls 42 further include a lower portion 48 (FIG. 4) extending therebetween. The lower portion 48 extends substantially the entire length of the second portion 22. The second portion 22 has overall dimensions that are smaller than the first portion 20 to permit the first portion 20 to receive the second portion 22. Also, the portion of the flanges 46 nearest the first portion 20 are sized smaller than the portion of the flanges 46 furthest from the first portion 20 to allow the first portion 20 to receive the second portion 22 and to provide a region of the flanges 46 that have the same width as the flanges 34 to promote cooperation between the cover 12 and the undersurface of the floor 16.

With further reference to FIG. 4, this cross-sectional view taken along line 4—4 of FIG. 2 illustrates the cooperation between the first portion 20 and the second portion 22. The cable 24 is not illustrated in FIG. 4 for clarity. The first portion 20 slidably receives the second portion 22 with the upper portion 40 positioned below the upper portion 26 and the side walls 42 positioned between the side walls 28. The tab portion 36 of the first portion 20 is positioned atop the lower portion 48 of the second portion 22. The side walls 42 of the second portion 22 are seated within the slots 38 of the first portion 20.

As illustrated in FIG. 2, the cable 24 extends from one end of the seat track cover 12 to the other end and through both the first portion 20 and the second portion 22. The cable 24 includes a first connector 50 at one end of the cable 24 and a second connector 52 at a second end of the cable 24 opposite the first end. The cable 24 is seated within the cover 12 such that the first connector 50 is at the exposed end of the first portion 20 and the second connector 52 is at the exposed end of the second portion 22. The first connector 50 and the second connector 52 are electrically or optically connected by conductors 54. The length of the conductors 54 is at least equal to the approximate length of the seat track cover 12 when the second portion 22 is fully extended from the first portion 20 to allow the cover 12 to fully extend to accommodate large seat pitch lengths. When the second portion 22 is not fully extended, excess length of the conductors 54 is folded within at least one of the first side wall 28 and the second side wall 42. While the conductors 54 are illustrated as a ribbon cable, the conductors 54 can be any suitable type of cabling that can conduct electricity and or data signals, such as a coaxial cable, a fiber optic cable, a copper wire, a coiled telephone cord, a spring loaded cord, etc.

With further reference to FIG. 5, the seat track cover 12 is illustrated installed between two seat groups 18. In particular, the seat track cover 12 is installed between a front seat leg 56 of one seat group 18 and a rear seat leg 58 of a neighboring seat group 18. The seat track cover 12 is sized, by slidably extending or retracting the second portion 22 relative to the first portion 20, to completely extend between the front seat leg 56 and the rear seat leg 58. The seat track cover 12 is orientated such that the first portion 20 abuts the rear seat leg 58 and the second portion 22 abuts the front seat leg 56. However, this orientation can be reversed as well.

The front seat leg 56 includes a front outlet 60. The front outlet 60 is sized and configured to connect with the second connector 52. The front outlet 60 is in cooperation with the electronic components of the seat group 18, such as any audio/video equipment, computer networking equipment, and/or electrical power outlets, to transfer electrical power and data signals to and from the seat group 18. The rear seat leg 58 includes a rear outlet 62 that is sized and configured to connect with the first connector 50. Like the front outlet 60, the rear outlet 62 is in cooperation with the electronic components of its associated seat group.

The cover 12 is positioned between the front seat leg 56 and the rear seat leg 58 such that the first connector 50 cooperates with the rear outlet 62 of the rear seat leg 58 and the second connector 52 cooperates with the front outlet 60 to provide an electrical and/or optical connection between the two seat groups 18. The connection between the first connector 50 and the rear outlet 62 is at least partially covered by and protected by the seat leg shroud 30. The connection between the second connector 52 and the front outlet 60 is covered and protected by the seat leg shroud 44. To fully span the distance between the front seat leg 56 and the rear seat leg 58 and provide this connection, the cover 12 is extended or retracted as needed by extending the second portion 22 from within the first portion 20, or retracting the second portion 22 within the first portion 20. The seat track cover 12 is secured in place between the front seat leg 56 and the rear seat leg 58 by securing the flanges 46 and 34 beneath the floor 16 in the region of the seat track 14.

Figure 6:
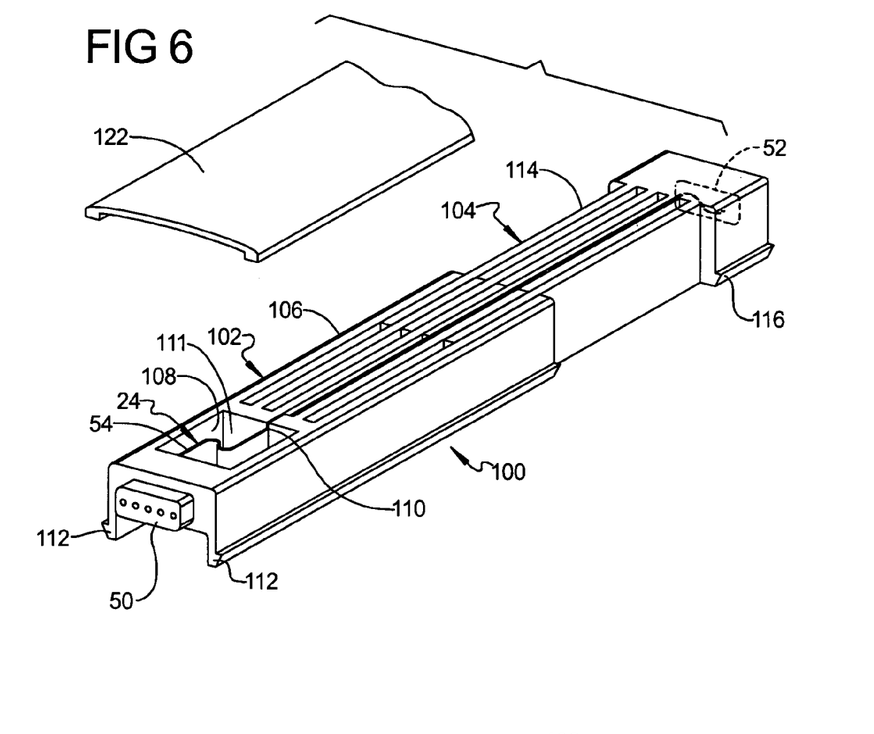
FIG. 6 is a perspective view of a seat track cover according to another embodiment of the invention.

With reference to FIG. 6, a seat track cover according to another embodiment of the present invention is illustrated at 100. The seat track cover 100 is similar to the seat track cover 12 in that it includes a first portion 102 and a second portion 104. The cable 24 extends the length of the cover 100 through both the first portion 102 and the second portion 104.

The first portion 102 includes a plurality of first fingers 106. The fingers 106 are spaced apart and are open at one end of the first portion 102. The first portion 102 further includes a recess 108. The recess 108 includes a slit 110 in a wall portion 111 that allows the cable 24 to extend into the recess 108. The flanges 112 extend from beneath the first portion 102. The flanges 112 are substantially similar to the flanges 34 of the seat track cover 12. Thus, the description of the flanges 34 of the seat track cover 12 equally applies to the flanges 112.

The second portion 104 includes a plurality of fingers 114. Like the fingers 106, the fingers 114 are spaced apart and open at one end of the second portion 104. The second portion 104 also includes flanges 116. The flanges 116 are similar to the flanges 34 and 46 of the seat track cover 12 and therefore, the description of the flanges 34 and 46 equally applies to the flanges 116.

The first portion 102 cooperates with the second portion 104 and slidingly receives the second portion 104. The fingers 106 of the first portion 102 interlock with the fingers 114 of the second portion 104 to provide the cooperation between the first and second portions 102 and 104. A small gap (not shown) is provided between the fingers 106 and the fingers 114 to accommodate the conductors 54 of the cable 24, as described below.

Figure 7A:
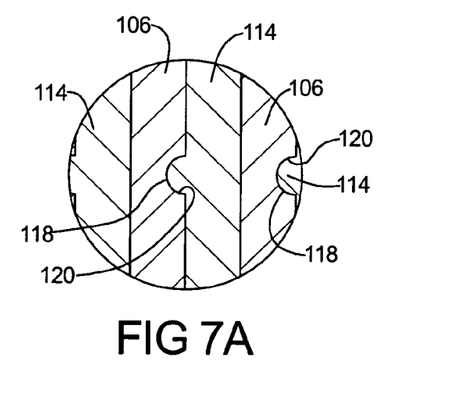
FIG. 7A is an expanded view illustrating interaction between first fingers and second fingers of the seat track cover of FIG. 6 according to an embodiment of the present invention.
Figure 7B:
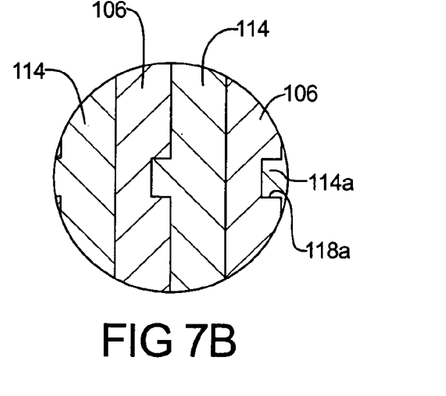
FIG. 7B is an expanded view illustrating interaction between first fingers and second fingers of the seat track cover of FIG. 6 according to another embodiment of the present invention.

With reference to FIG. 7A, to insure proper vertical alignment between the first portion 102 and the second portion 104, the fingers 106 of the first portion 102 include recesses 118 that extend the length of the fingers 106 and the fingers 114 of the second portion 104 include protrusions 120 that extend the length of the fingers 114. The recesses 118 cooperate with the protrusions 120 to insure vertical alignment between the first portion 102 and the second portion 104. The recesses 118 and the protrusions 120 can be of various different shapes, such as having matching square shapes 114a and 118a in FIG. 7B.

With continued reference to FIG. 6, the cable 24 is inserted within the seat track cover 100 such that the first connector 50 is at the exposed end of the first portion 102 and the second connector 52 is at the exposed end of the second portion 104. The conductors 54 extend between the first and second connectors 50 and 52. Specifically, the conductors 54 extend from the first connector 50 to within the recess 108. From the recess 108 the conductors 54 extend through the slit 110 and along the length of the fingers 106 of the first portion 102 and along the length of the fingers 114 of the second portion 104 to the second connector 52 within the small gap between the fingers 106 and 114. The recess 108 accommodates excess portions of the conductors 54 that are required to span the distance between the first connector 50 and the second connector 52 when the second portion 104 is fully extended from the first portion 102. To secure the connector 54 in position, the connector 54 can optionally be secured, using a suitable adhesive or other fastening device or method, to the fingers 114 of the second portion 104.

The seat track cover 100 is installed between the front seat leg 56 and the rear seat leg 58 to provide a connection between the first connector 50 and the second connector 52 in substantially the same manner that the seat track cover 12 is. Therefore, the description of the installation of the seat track cover 12 equally applies to the seat track cover 100. However, to cover the recess 108, the fingers 106, and the fingers 114, a shield 122 can be employed. The shield 122 is positioned over the cover 100 and can be secured either to the cover 100 or to the portions of the floor 16 surrounding the cover 100. The shield 122 can include the seat leg shroud 44 to cover the connection between the second connector 52 and the front outlet 60 of the front seat leg 56. The shield 122 can further include the seat leg shroud 30 to cover the connection between the rear outlet 62 and the first connector 50. The shield 122 can include a seal to prevent liquids and other foreign materials from contacting the cover 100. The shield 122 can be made of any suitable material, such as carpet or at least have a carpet covering.

Figure 8:
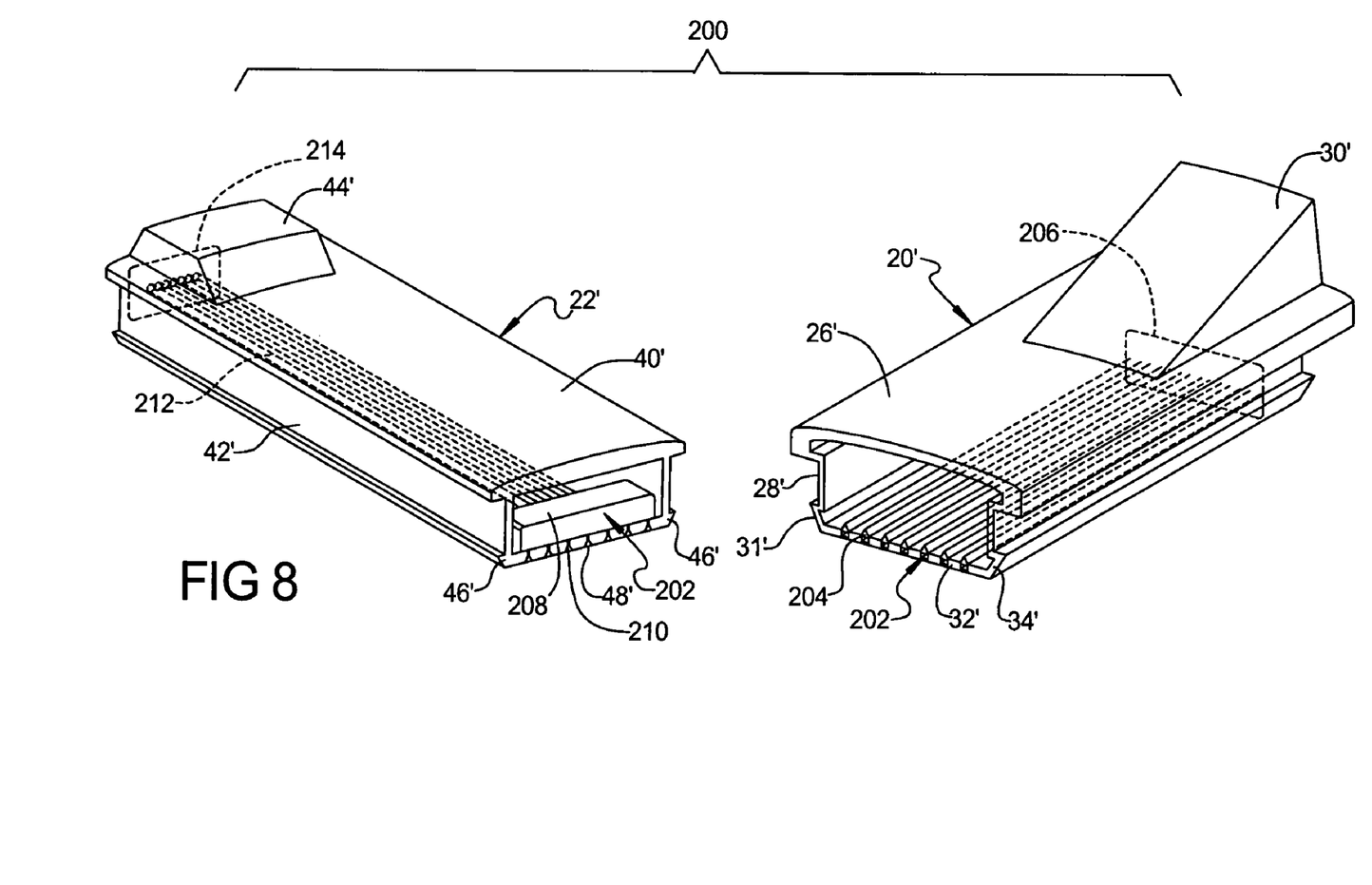
FIG. 8 is a side perspective view of a seat track cover according to another embodiment of the present invention, the seat track cover having a power bus.

With additional reference to FIG. 8, a seat track cover according to another embodiment of the present invention is illustrated at 200. The structure of the seat track cover 200 is substantially similar to the structure of the seat track cover 12. Therefore, the portions of the seat track cover 200 that are identical to the seat track cover 12 are designated with like reference numbers having a prime symbol and the description of these like elements provided above equally applies to the seat track cover 200.

The seat track cover 200 does not include the cable 24 as the cover 12 does. Instead, the seat track cover 200 has an internal power bus 202 for conducting signals and/or power. The power bus 202 extends through both the first portion 20' and the second portion 22'. The portion of the power bus 202 in the first portion 20' includes a plurality of contacts 204. The contacts 204 extend along the top surface of the bottom portion 32' of the first portion 20'. The contacts 204 can be of any suitable material for conducting electricity and/or optical signals. If electrical signals are being conducted, then the contacts 204 will preferably be formed from copper, gold, etc. The contacts 204 are in cooperation with a first connection port 206 that can mate with other devices to transfer signals to or from the power bus 202.

The second portion 22' also houses portions of the power bus 202 including a connector block 208. The connector block 208 is seated on the lower portion 48' of the second portion 22' at the end of the second portion 22' received by the first portion 20'. The connector block 208 has a plurality of couplers 210 that typically correspond to the number of contacts 204 of the first portion 20'. Each of the couplers 210 mate with one of the contacts 204 of the first portion 20' to conduct electricity and/or data between the first portion 20' and the second portion 22' regardless of how far the second portion 22' is retracted within or extended from the first portion 20'.

Extending from the connector block 208 are a plurality of conductors 212 that connect the connector block 208 to a second connection port 214. The connection port 214 is at the exposed end of the second portion 22' opposite the connector block 208. The connection port 214 connects with an external device to transfer signals to/from the power bus 202.

The cover 200 is installed between the front seat leg 56 and the rear seat leg 58 in substantially the same manner that the cover 12 is. Therefore, the above description of the installation of the cover 12 equally applies to the cover 200. Installation of the cover 200 between the seat legs 56 and 58 includes connecting the first connection port 206 to the rear outlet 62 and includes connecting the second connection port 214 to the front outlet 60. Therefore, the seat track cover 200 provides a power and/or data connection between the two adjacent seat groups 18 of the rear seat leg 58 and the front seat leg 56.

Figure 9:
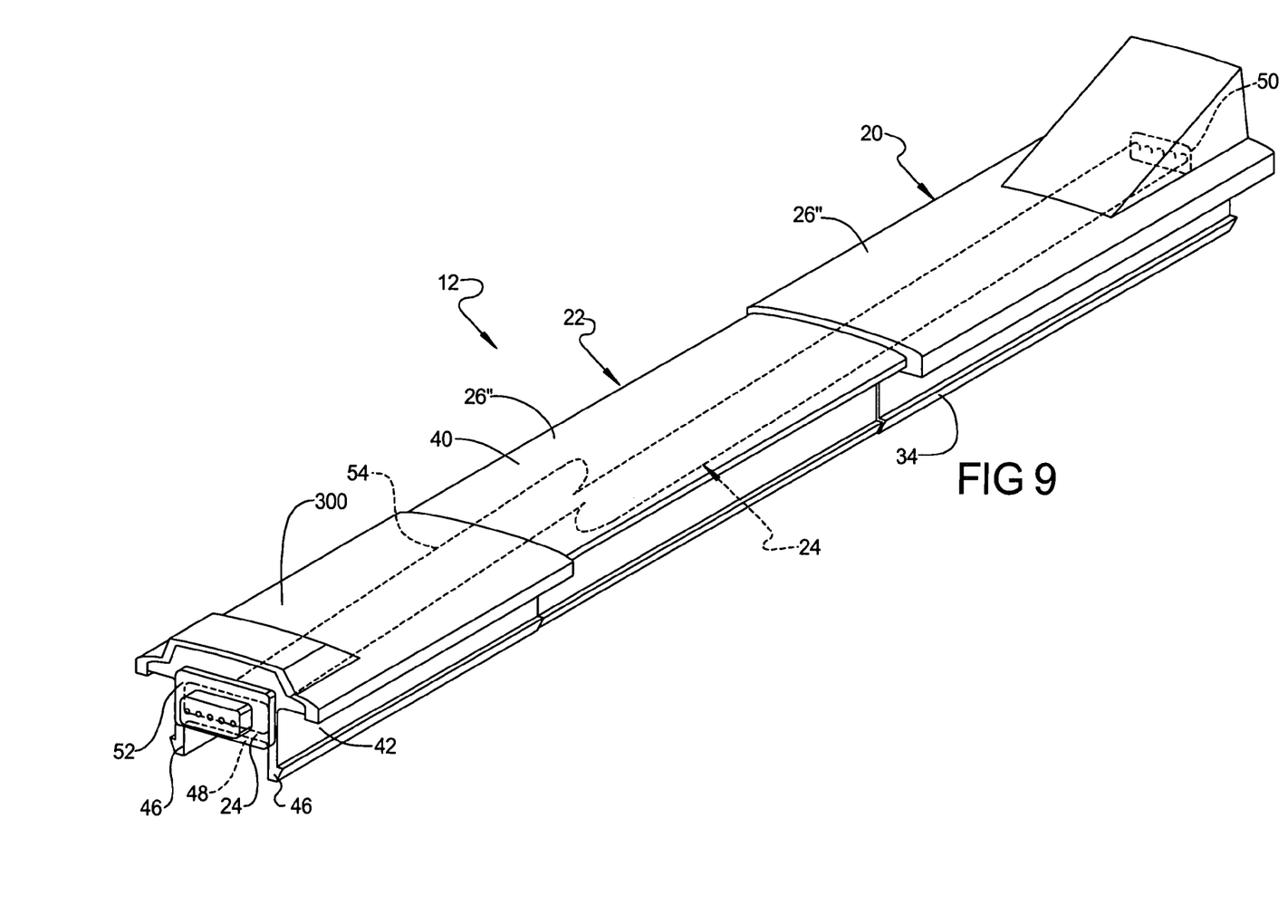
FIG. 9 is a perspective view of the seat track cover of FIG. 2 having a false upper portion.

With additional reference to FIG. 9, the seat track cover 12 is illustrated equipped with an optional false upper portion 300. The false upper portion 300 is secured to the upper portion 40 of the second portion 22 using any suitable attachment method or device, such as an adhesive. The false upper portion 300 can also be integral to the second portion 22. The width of the false upper portion 300 approximately equals the width of the upper portion 26. Therefore, as the second portion 22 is extended from or retracted within the first upper portion 26, it appears that only the part of the upper portion 40 not covered by the false upper portion 300 is changing length, making it difficult to discern that second portion 22 as a whole is changing length as it is extended from or retracted within the first portion 20.

FIG. 9 illustrates the cover 12 as having a single false portion 300. However, the cover 12 can include numerous false portions similar to the false portion 300 to disguise the fact that the second portion 22 is narrower than the first portion 20. Additional devices and methods that can be used to disguise the fact that the second portion 22 is more narrow than the first portion 20 include coloring, shading, or varying the texture of the first and second portions 20 and 22, including any false upper portions 300 that might be used, so that the half of the second portion 22 nearest the second seat leg shroud 44 has the same color, shade or texture as the upper portion 26. Further, multiple false portions 300 can be used.

Figures 10, 12:
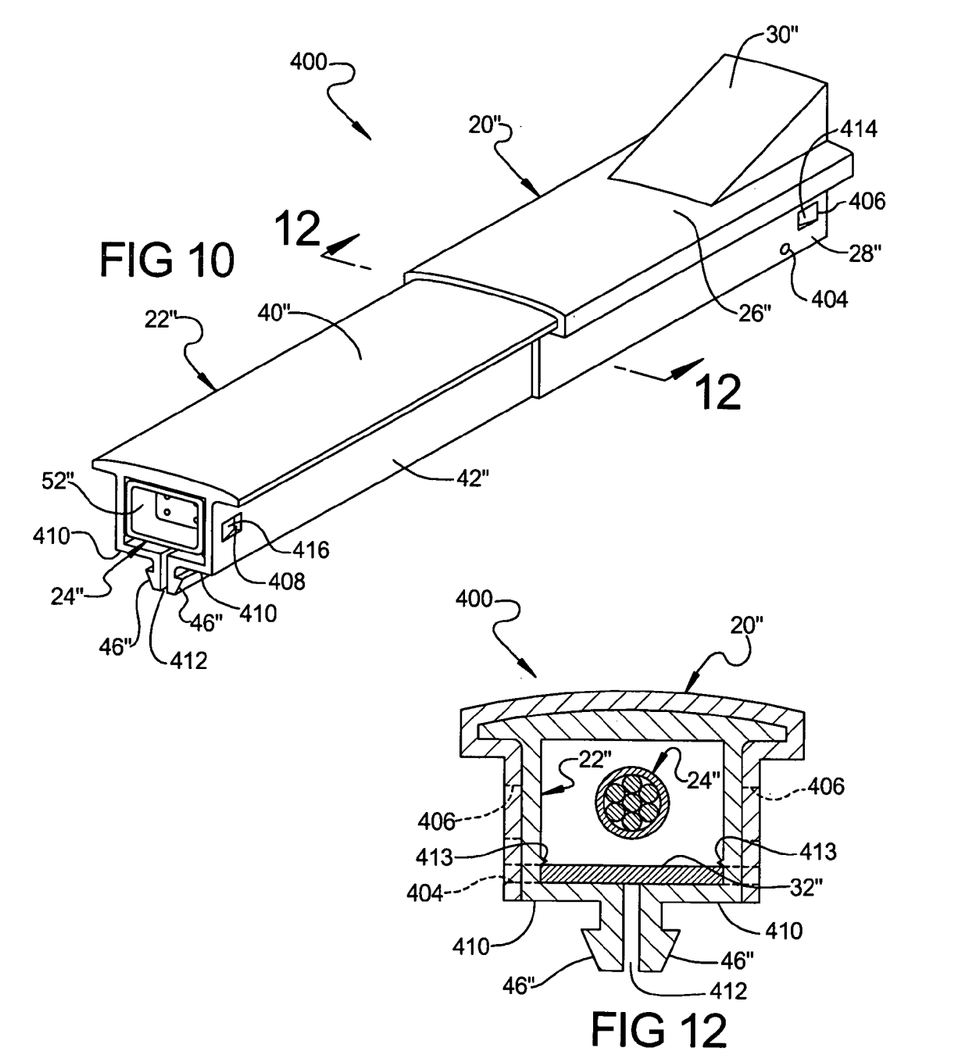
FIG. 10 is a perspective view of a seat track cover according to another embodiment of the present invention.
FIG. 12 is a cross-sectional view taken along line 12—12 of FIG. 10.
Figure 11:
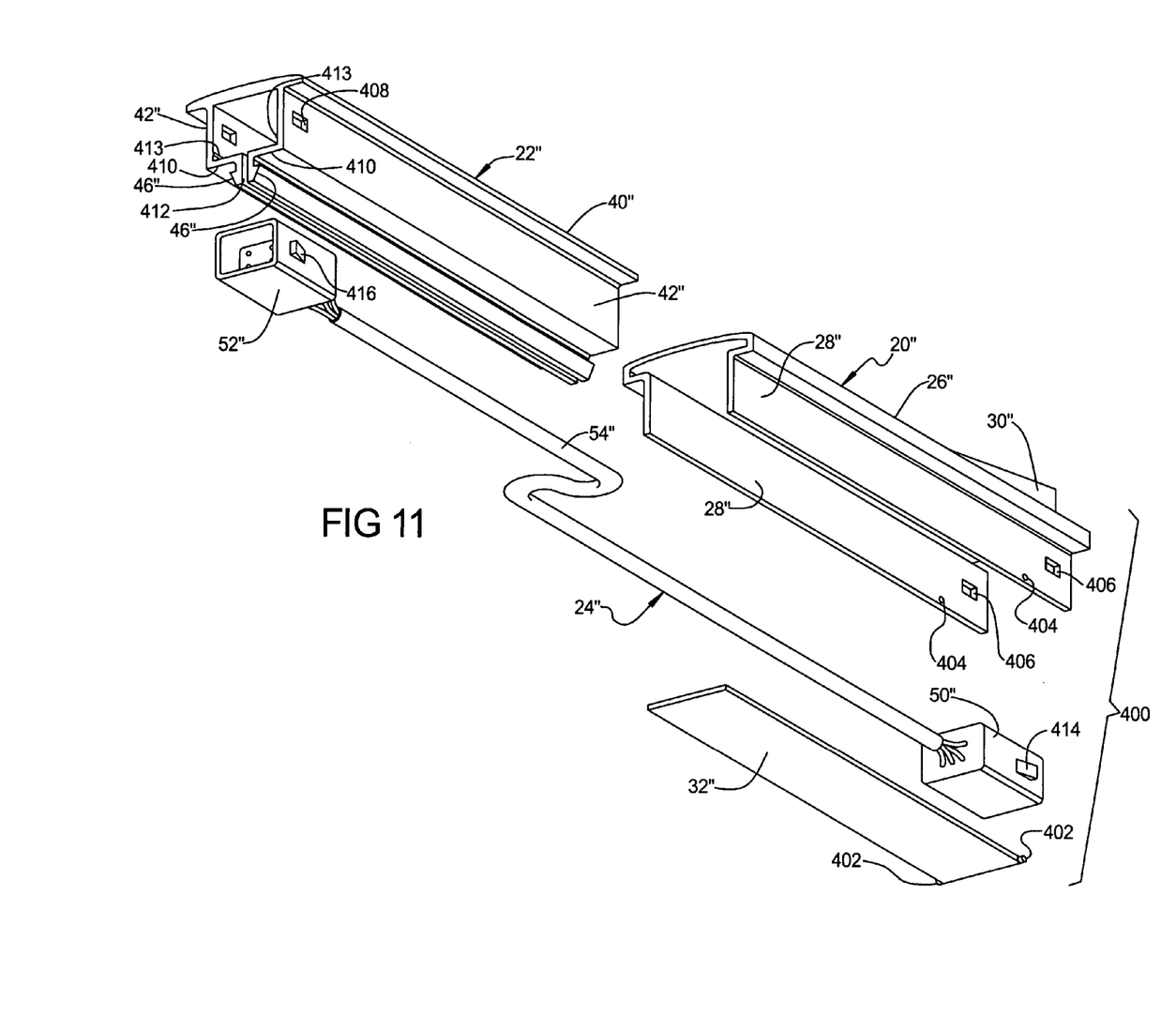
FIG. 11 is an exploded view of the seat track cover of FIG. 10.

With additional reference to FIGS. 10–12, a seat track cover according to another embodiment of the present invention is illustrated at 400. The structure of the seat track cover 400 is substantially similar to the structure of the seat track cover 12. Therefore, the portions of the seat track cover 400 that are substantially similar to the seat track cover 12 are designated with like reference numbers having a double prime symbol and the description of these like elements provided above equally applies to the seat track cover 400.

The cover 400 generally includes a first portion 20" and a second portion 22". Extending between the first portion 20" and the second portion 22" is an optional cable 24". The first portion 20" generally includes an upper portion 26" and side walls 28" that depend from the upper portion 26". A seat leg shroud 30" extends from the upper portion 26" and is sized to receive a portion of the rear seat leg 58.

As seen in FIG. 11, the first portion 20" further includes a bottom portion 32" that includes bosses 402 that cooperate with apertures 404 on the side walls 28" to secure the bottom portion 32" between the side walls 28". The width of the bottom portion 32" is less than the distance between the side walls 28" to accommodate the second portion 22" as described below and as illustrated in FIG. 12. The side walls 28" also include holes 406 to mount the cable 24", as described below.

The second portion 22" includes an upper portion 40" and a pair of side walls 42". The side walls 42" include holes 408 to cooperate with the cable 24" as further explained below. Extending inward from the bottom of each of the side walls 42" are horizontal portions 410 that terminate near the center of the second portion 22" at the flanges 46". Unlike the flanges 46, the flanges 46" are moved inward from the side walls 42" toward the center of the second portion 22". Between the flanges 46" is a gap 412. The position of the flanges 46 inboard from the side walls 42" permits the flanges to cooperate directly with the seat track 14, instead of with the undersurface of the floor 16 as the flanges 46 do. Extending at least a portion of the length of the interior of the side walls 42", just above the horizontal portions 410, are side rails 413.

The cable 24" includes a first connector 50" at one end and a second connector 52" at an opposite end of the cable 24" connected by conductors 54". The first connector 50" includes details 414 that extend from the sides of the first connector 50". Likewise the second connector 52" includes details 416 that extend from the sides of the second connector 52".

To assemble the cover 400, the cable 24" is inserted within the first and second portions 20" and 22" by inserting the conductors 54" through the gap 412. Next, the first connector 50" is inserted between the side walls 28" so that the details 414 are received by the holes 406 to secure the first connector 50" into position. Likewise, the second connector 52" is inserted between the side walls 42" and above the side rails 413 so that the details 416 are received by the holes 408 to secure the connector 52" into position. Before or after the first connector 50" is secured into position, the bottom portion 32" is attached to the first portion 20" by moving the bosses 402 into cooperation with the apertures 404.

FIG. 12 is a cross sectional view taken along like 12—12 of FIG. 10 of the cover 400 as assembled. As illustrated in FIG. 12, the second portion 22" is seated within the first portion 20'". Further the bottom portion 32" is positioned between the horizontal portions 410 and the side rails 413. The cover 400 is positioned between the seat legs 56 and 58 to provide a data and/or electrical connection between the outlets 60 and 62 in substantially the same manner that the cover 12 is and therefore the above description of the positioning of the cover 12 between the seat legs 56 and 58 equally applies to the cover 400, the only substantial difference being that the cover 400 is secured directly to the seat track 14 rather than the floor 16.

Figures 13, 14:
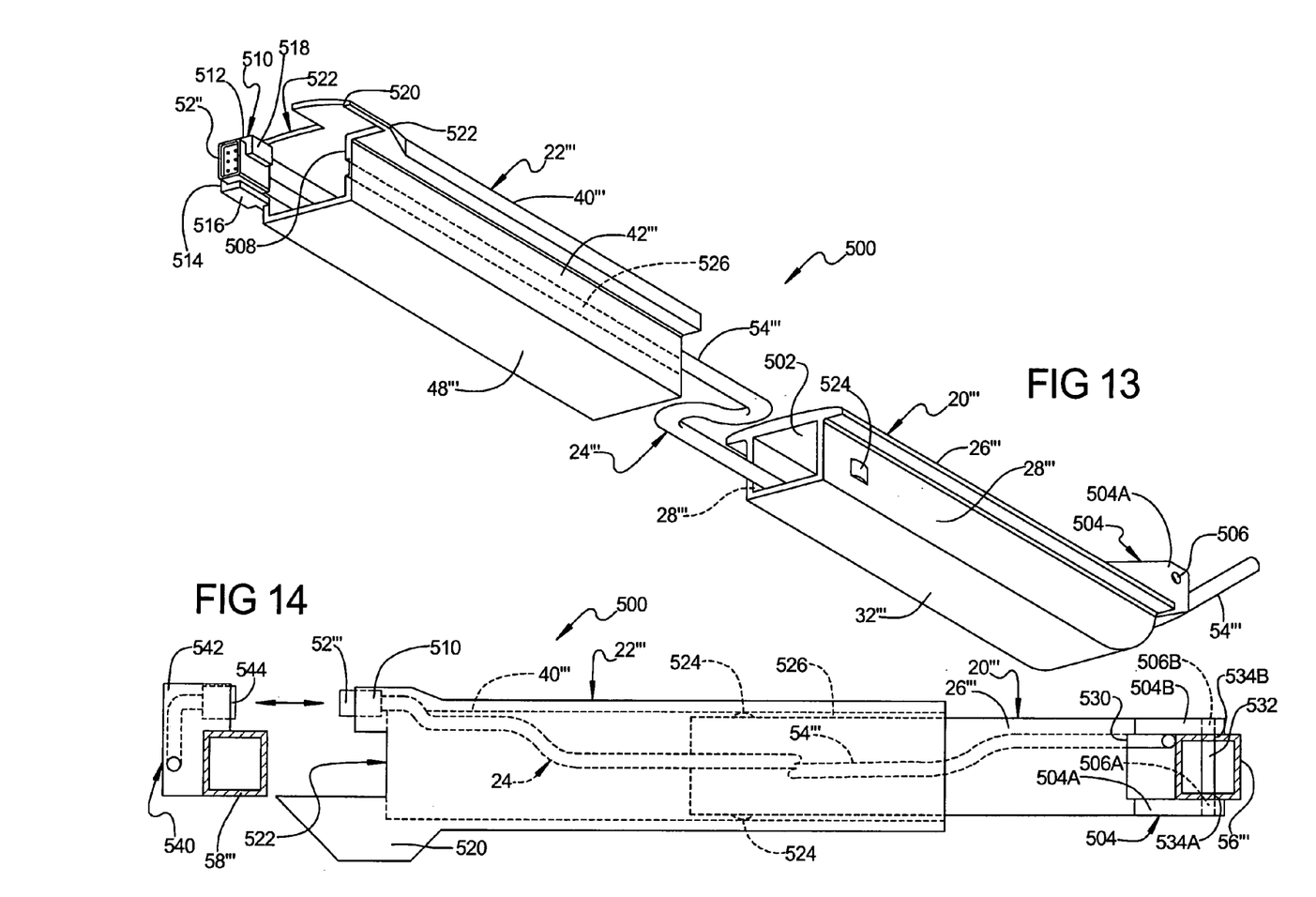
FIG. 13 is a perspective view of an unassembled seat track cover according to another embodiment of the present invention.
FIG. 14 is an assembled plan view of the seat track cover of FIG. 13, the seat track cover rotatably secured to a seat leg.

With additional reference to FIGS. 13 and 14, a seat track cover according to another embodiment of the present invention is illustrated at reference numeral 500. The structure of the seat track cover 500 is similar to the structure of the seat track cover 12. Therefore, the portions of the seat track cover 500 that are similar to the seat track cover 12 are designated with like reference numerals having a triple prime symbol ('") and the description of these like elements provided above equally applies to the seat track cover 500.

The cover 500 generally includes a first portion 20'" and a second portion 22'". The first portion 20'" generally includes an upper portion 26'", a pair of spaced apart side walls 28'" that depend from the upper portion 26'", and a bottom portion 32'" that is approximately parallel to the upper portion 26'" and spans the two side walls 28'". The upper portion 26'", the side walls 28'", and the bottom portion 32'" define a first aperture 502.

A bracket assembly 504 extends from the upper portion 26'". The bracket assembly 504 can include a first bracket 504A and a second bracket 504B. The first bracket 504A is spaced apart from the second bracket 504B at a distance great enough to accommodate either the front seat leg 56'" or the rear seat leg 58'" between the first and second brackets 504A and 504B. The bracket 504A includes a through hole 506A and the bracket 504B includes a through hole 506B. The through hole 506A is aligned with the through hole 506B. The bracket assembly 504 can be any suitable bracket assembly operable to pivotally mount the seat track 500 to either the front seat leg 56'" or the rear seat leg 58'".

The portions of the side walls 28'" and the bottom portion 32'" can be curved in the region proximate to the bracket assembly 504, as illustrated in FIG. 13, to provide the first portion 20'" with a curved terminus at one end to facilitate pivoting of the cover 500. Specifically, the bottom portion 32'" is curved upward toward the upper portion 26'". The side walls 28'" are curved from the bottom portion 32'" to the upper portion 26''' in a plane at least substantially perpendicular to the upper portion 26'''.

The second portion 22''' generally includes an upper portion 40''', a pair of spaced apart side walls 42''' that are generally perpendicular to the upper portion 40''' and depend from the upper portion 40''', and a lower portion 48''' that is generally parallel to the upper portion 40''' and extends between the side walls 42'''. The upper portion 40''', the side walls 42''', and the lower portion 48''' define a second aperture 508. The second aperture 508 is generally sized and shaped to receive the first portion 20'''.

The second portion 22''' further includes a retainer 510. As illustrated in FIG. 14, the retainer 510 extends from one of the side walls 42''' and the upper portion 40'''. The retainer 510 is generally rectangular and includes an upper portion 512, an outer side portion 514, a lower portion 516, and an inner side portion 518. The upper portion 512 and the lower portion 516 are generally parallel. The outer side portion 514 and the inner side portion 518 are generally parallel to each other and are generally perpendicular to the upper portion 512 and the lower portion 516 respectively. The outer side portion 514 extends between the upper portion 512 and the lower portion 516. The inner side portion 518 extends from the upper portion 512, but does not extend entirely to the lower portion 516. The retainer 510 can be integral with the side portion 42''' and/or the upper portion 40''' or the retainer 510 can be a separate device that is secured to the second portion 22''' using any suitable fastening means. The retainer 510 extends beyond the second aperture 508 and is offset from the remainder of the second portion 22''' such that the retainer 510 is beyond the width of the upper portion 40''', as best illustrated in FIG. 14. The retainer 510 can be any suitable retainer operable to securely mount at least one of the first and second connectors 50''' and 52''' of the cable 24''', as described in greater detail below.

The second portion 22''' still further includes an extended portion 520 that extends from the upper portion 40''' above the side wall 42''' that is opposite to the retainer 510. At least a part of the extended portion 520 extends beyond the width of the upper portion 40'''. The extended portion 520, the retainer 510, and the upper portion 40''' generally define a "U" shaped receptacle 522. The receptacle 522 is sized to receive and surround a portion of either the front seat leg 56''' or the rear seat leg 58''', as described in further detail below.

The first portion 20''' is slidingly received by the second aperture 508 of the second portion 22'''. The first portion 20''' may include a pair of details 524 that protrude from the surface of the side walls 28''' that is opposite the first aperture 502. The details 524 slidingly cooperate with recesses 526 to maintain cooperation between the first portion 20''' and the second portion 22'''. The sliding cooperation between the details 524 and the recessed 526 also allows the first portion 20''' to slide within the second aperture 508 to increase and decrease the overall length of the cover 500.

The cable 24''' extends the length of the cover 500. The cable 24''' is similar to the cable 24 except that the cable 24''' includes only one connector, such as the connector 52'''. The connector 52''' can be of any suitable size or shape that can be received by the retainer 510. The connector 52''' can be secured to the retainer 510 using any suitable fastening means, such as a press-fit, an adhesive, or a mechanical interlock. The conductors 54''' are secured to the connector 52''' and extend at least substantially the entire length of the cover 500 through the second aperture 508 and the first aperture 502. The conductors 54''' exit the first aperture 502 through an opening 530 proximate to the bracket assembly 504.

The cover 500 is pivotally attached to either the rear seat leg 58''' or the front seat leg 56'''. As illustrated in FIG. 14, the cover 500 is secured to the front seat leg 56''' by a pin 532 that cooperates with the through holes 506A and 506B of the brackets 504A and 504B respectively and holes 534A and 534B formed on opposing sidewalls of the front seat leg 56'''. The cover 500 can also be pivotally secured to the rear seat leg 58''' in a similar manner. The cover 500 can also be pivotally secured to the rear seat leg 58''' or the front seat leg 56''' in any other suitable manner.

The seat leg of the adjoining seat group 18 that is opposite the seat leg that the cover 500 is pivotally secured to, such as the rear set leg 58''' of FIG. 14, can have an outlet assembly 540. The outlet assembly 540 includes an outlet support bracket 542 and an outlet 544. The outlet support bracket 542 is mounted to the rear seat leg 58''', for example, using any suitable fastening means. The outlet 544 is mounted to the support bracket 542 using any suitable retaining means. The outlet 544 is exposed in the direction of the opposing seat leg, such as the front seat leg 56'''. The outlet 544 can be offset to the side of the rear seat leg 58''', as illustrated in FIG. 14, to permit cooperation with the second connector 52'''. The outlet 544 is usually offset on the side of the rear set leg 58''' that is under the passenger seat and inboard from the aircraft aisle, at least when the cover 500 is used in an aircraft. The outlet 544 is in cooperation with the electronics of the seat group 18 associated with the rear seat leg 58'''.

In many applications, the cover 500 is pivotally secured to the desired seat leg, such as the front seat leg 56''' or the rear seat leg 58''', and the outlet assembly 540 is secured to the opposing seat leg, such as the rear seat leg 58''' or the front seat leg 56''', during assembly of the seat group 18 outside the passenger cabin 10 by the seat group manufacturer. During transport of the seat group 18 to the passenger cabin 10, the cover 500 is rotated upward such that the cover 500 is approximately parallel with the front seat leg 56''' or the rear seat leg 58'''. After the seat groups 18 are in position, the cover 500 is rotated downward to within the seat track 14 and the second portion 22''' is extended from the first portion 20''' and the second connector 52''' is brought into connection with the outlet 544 to provide an electrical and/or optical connection between adjoining seat groups 18.

While various preferred embodiments of the seat track cover have been disclosed, it will be appreciated that other features and aspects can be employed within the scope of the present invention. For example, any of the covers 12, 100, 200, 300, 400, and 500 described above can include a first connector extension (not shown) extending from the first portion 20 and a second connector extension (not shown) extending from the second portion 22. In this embodiment the cable 24 or the power bus 202 do not directly contact the front outlet 60 or the rear outlet 62. Instead, the first and second connector extensions each receive one of the first connector 50 and the second connector 52 respectively and it is the first and second connector extensions that cooperate with the front outlet 60 and the rear outlet 62 respectively.

Further, the front outlet 60 and the rear outlet 62 of the front and rear seat legs 56 and 58 respectively can be movable or spring-loaded in a variety of different directions, such as horizontal relative to the floor 16 to facilitate connection with the covers 12, 100, 200, 300, 400, and 500. Still further, the first connector 50 and the second connector 52, as well as the front outlet 60 and the rear outlet 62, can be orientated in a variety of different directions in addition to the orientations illustrated, such as upward or downward in relation to the floor 16.

Also, the power bus 202 can be positioned within the cover 200 at other areas besides the lower portion 48 and the bottom 32, such as along the sides of the cover 200 and along an upper portion of the cover 200.

Additionally, the covers 12, 200, 300, 400, and 500 can include more portions in addition to the portions 20 and 22 to increase the length of the covers 12, 200, 300, 400, and 500. For example, the first and second portions 20/22 can be resized to accommodate a third portion between or on either side of the first and second portions 20/22. The overall length of the covers 12 or 200 would then be increased by the length of the third portion. Similarly, the first and second portions 102 and 104 can be re-sized to accommodate additional portions between or on either side of the first and second portions 102/104 to increase the length of the cover 100.

Also, any of the covers 12, 100, 200, 300, and 400 can be secured to at least one of the seat legs 56 and 58, such as the cover 500 is. The covers 12, 100, 200, 300, and 400 can be pivotally secured to at least one of the seat legs 56 and 58 in any suitable manner, such as the manner in which the cover 500 is. Securing the seat legs 12, 100, 200, 300, 400, and 500 to at least one of the seat legs 56 and 58 facilitates installation of the seat groups 18 within the passenger cabin 10.

Finally, the position of the flanges 34, 46, 112, and 116 can vary depending upon the surface that the cover is to engage. For example, any of the flanges can be positioned inward of the side walls, such as the flanges 46" of the cover 400 (FIG. 10) are to mate with the seat track 14, or at the side walls, such as the flanges 34/46 of the cover 12 (FIG. 2) are to mate with the under surface of the floor 16. Further, one or more fasteners can be used to attach the covers 12 or 200 to the seat track 14 or the passenger cabin floor 16.

Therefore, the present invention provides for a telescoping seat track cover that can expand and contract to cover the portions of the seat track between two seat groups regardless of the distance between the seat groups. The seat track cover can be wired to conduct data and/or electricity between the seat groups.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A seat track cover for covering a seat track extending between first and second seats, the seat track cover comprising:
    a first elongated portion defining a channel;
    a second elongated portion having dimensions enabling it to be telescopically engaged within the channel of the first elongated portion, wherein an overall length of the seat track cover can be adjusted to approximately match a distance of the seat track separating the first and second seats; and
    a conductor mounted to at least one of said first portion and said second portion and extending from said first portion to said second portion;
    said conductor having:
        a first connector located in said first portion, said first connector adapted to engage an outlet adjacent a first seat leg of the first seat; and
        a second connector located in said second portion, said second connector adapted to engage an outlet adjacent a second seat leg of the second seat.

2. The seat track cover of claim 1, wherein said first portion comprises:
    a first upper portion;
    first side walls; and
    a tab that defines a first slot and a second slot between said tab and said first side walls;
    wherein said second portion further comprises:
    a second upper portion;
    second side walls; and
    a lower portion;
    wherein said second portion is seated within said first portion such that said second upper portion is seated within said first upper portion, said first side walls are positioned between said second side walls and said slots, and said tab is seated above said lower portion.

3. The seat track cover of claim 1, wherein said first portion comprises a plurality of first fingers and said second portion comprises a plurality of second fingers; and
    wherein said first fingers interlock with said second fingers when said seat track cover is in the first position and the second position.

4. The seat track cover of claim 3, wherein said first fingers include a recess and said second fingers include a protrusion; and
    wherein said recess receives said protrusion to maintain said first portion and said second portion in substantial vertical alignment.

5. The seat track cover of claim 1, wherein said first portion includes at least one power bus contact extending substantially the length of said first portion and said second portion includes a connector block having at least one coupler that slidably cooperates with said contacts as said cover is moved between the first position and the second position.

6. The seat track cover of claim 1, wherein said first portion includes a first seat leg shroud to accommodate a rear seat leg of the first seat and said second portion includes a second seat leg shroud to accommodate a front seat leg of the second seat.

7. The seat track cover of claim 1, wherein said second portion further includes a false upper portion having a width that approximates a width of a first upper portion of said first portion.

8. The seat track cover of claim 1, wherein at least one of the first and second elongated portions include members adapted to engage with a portion of at least one of the seat track and a floor proximate to the seat track to releasably secure the first and second elongated portions to at least one of said seat track and said floor.

9. The seat track cover of claim 1, wherein at least one of said first elongated portion and said second elongated portion are secured to one of the first and second seats.

10. The seat track cover of claim 1, wherein at least one of said first elongated portion and said second elongated portion are rotatably secured to one of the first and second seats.

11. A seat track cover for covering portions of a seat track between a first seat and a second seat comprising:
    an upper portion;
    side walls depending from said upper portion;

a first elongated portion;
a second elongated portion;
a conductive cable mounted to said seat track cover and extending the length of said seat track cover to conduct at least one of current and data across said seat track cover;
a first connector of said conductive cable mounted to said first elongated portion, said first connector adapted to engage an outlet adjacent a first seat leg of the first seat; and
a second connector of said conductive cable mounted to said second elongated portion, said second connector adapted to engage an outlet adjacent a second seat leg of the second seat;
wherein the overall length of said seat track cover is adjustable between a first length and a second length to accommodate the distance between the first seat and the second seat, the first length providing said seat track cover with an overall length that is greater than the second length; and
wherein said second portion extends from said first portion to a greater distance when said cover is at the first length then when said cover is at the second length.

12. The seat track cover of claim 11, wherein said first portion comprises:
a first upper portion;
first side walls; and
a tab that defines a first slot and a second slot between said tab and said first side walls;
wherein said second portion further comprises:
a second upper portion;
second side walls; and
a lower portion;
wherein said second portion is seated within said first portion such that said second upper portion is seated within said first upper portion, said second side walls are positioned between said first side walls and said slots, and said tab is seated above said lower portion.

13. The seat track cover of claim 11, wherein said first portion comprises a plurality of first fingers and said second portion comprises a plurality of second fingers; and
wherein said first fingers interlock with said second fingers when said cover is at the first length and the second length.

14. The seat track cover of claim 13, wherein said first fingers include a recess and said second fingers include a protrusion; and
wherein said recess receives said protrusion to maintain said first portion and said second portion in substantial vertical alignment.

15. The seat track cover of claim 11, wherein said first portion includes at least one power bus contact extending substantially the length of said first portion and said second portion includes a connector block having at least one coupler that slidably cooperates with said contacts as said cover Is moved between the first length and the second length.

16. The seat track cover of claim 11, wherein said first portion includes a first seat leg shroud to accommodate a rear seat leg of the first seat and said second portion includes a second seat leg shroud to accommodate a front seat leg of the second seat.

17. The seat track cover of claim 11, further comprising at least one flange extending from said side walls;
wherein said flange cooperates with at least one of the seat track and a floor approximate to said seat track.

18. The seat track cover of claim 11, wherein at least one of said first elongated portion and said second elongated portion is pivotally secured to one of the first seat and the second seat.

19. A method for covering exposed portions of a seat track that supports first and second spaced apart seats, the method comprising:
forming a cover having first and second portions that telescopically engage with one another so that an overall length of the cover can be adjusted as needed to approximate a distance of an exposed portion of the seat track that separates the two seats;
forming a portion of at least one of the first and second portions with a member that releasably engages a portion of at least one of the seat track and a floor approximate to the seat track; and
installing a cable within the cover such that a first connector of the cable is mounted at an end of the first portion and a second connector of the cable is mounted at an end of the second portion, the cable operable to conduct at least one of data and current, the first connector is adapted to engage an outlet adjacent a first seat leg of the first seat, the second connector is adapted to engage an outlet adjacent a second seat leg of the second seat.

20. A method for covering exposed portions of a seat track that supports first and second spaced apart seats, the method comprising:
forming a cover having first and second portions that telescopically engage with one another so that an overall length of the cover can be adjusted as needed to approximate a distance of an exposed portion of the seat track that separates the two seats;
mounting a conductive cable to the cover;
mounting a first connector of the conductive cable to the first portion, the first connector adapted to engage an outlet adjacent a first seat leg of the first seat;
mounting a second connector of the conductive cable to the second portion, the second connector adapted to engage an outlet adjacent a second seat leg of the second seat; and
rotatably mounting at least one of the first portion and the second portion to one of the first and second seats.

* * * * *